US006459169B1

(12) United States Patent
Onodera

(10) Patent No.: US 6,459,169 B1
(45) Date of Patent: Oct. 1, 2002

(54) VEHICULAR INPUT DEVICE CAPABLE OF BEING ADJUSTED TO CONFORM TO THE PHYSICAL CONSTITUTION OF THE OPERATOR

(75) Inventor: Mikio Onodera, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 45 days.

(21) Appl. No.: 09/615,311

(22) Filed: Jul. 13, 2000

(30) Foreign Application Priority Data

Jul. 14, 1999 (JP) .......................................... 11-200947

(51) Int. Cl.[7] ............................ B60K 35/00; B60L 1/00
(52) U.S. Cl. ...................................... 307/10.1; 180/315
(58) Field of Search ............................ 200/52 R, 61.85, 200/1 R–1 V; 307/9.1, 10.1–10.8, 112–150; 180/271–273, 315–336; 477/165

(56) References Cited

U.S. PATENT DOCUMENTS 4,574,651 A * 3/1986 Nordstrom ........... 200/61.85 X
5,315,900 A * 5/1994 Teeter .................. 200/52 R X
5,767,464 A * 6/1998 Dyer et al. ................. 200/5 A
5,952,730 A 9/1999 Haller et al. ............... 307/10.1
6,366,442 B1 * 4/2002 Onodera .................... 307/10.1

* cited by examiner

*Primary Examiner*—J. R. Scott
(74) *Attorney, Agent, or Firm*—Brinks Hofer Gilson & Lione

(57) ABSTRACT

A vehicular input device is disclosed whose mounting posture can be adjusted freely in conformity with the physical constitution and form of an operator and which is superior in both versatility and operability. A transfer plate is connected to a ball screw through a nut so as to be moved forward and backward by a first motor. A rotary shaft, which is rotated by a second motor, is mounted on the transfer plate, and a housing of the vehicular input device is fixed to end portions of the rotary shaft. The first motor is rotated forward or reverse by operating a manual operating unit provided in the vehicular input device, thereby causing the housing to move forward or backward respect to a dash board. Likewise, the second motor is rotated forward or reverse by operating the manual operating unit, thereby causing a front end portion of the housing to turn upward or downward with respect to the dash board.

5 Claims, 12 Drawing Sheets

FIG. 10

| X0 | X1 | X2 | X3 | X4 | X5 | X6 | X7 | |
|---|---|---|---|---|---|---|---|---|
| +1<br>−1 | +1<br>0 | +1<br>0 | 0<br>0 | 0<br>0 | −1<br>0 | −1<br>0 | −1<br>−1 | Y7 |
| 0<br>−1 | +1<br>−1 | +1<br>0 | 0<br>0 | 0<br>0 | −1<br>0 | −1<br>−1 | 0<br>−1 | Y6 |
| 0<br>−1 | 0<br>−1 | +1<br>−1 | 0<br>0 | 0<br>0 | −1<br>−1 | 0<br>−1 | 0<br>−1 | Y5 |
| 0<br>0 | 0<br>0 | 0<br>0 | 0<br>0 | 0<br>0 | 0<br>0 | 0<br>0 | 0<br>0 | Y4 |
| 0<br>0 | 0<br>0 | 0<br>0 | 0<br>0 | 0<br>0 | 0<br>0 | 0<br>0 | 0<br>0 | Y3 |
| 0<br>+1 | 0<br>+1 | +1<br>+1 | 0<br>0 | 0<br>0 | −1<br>+1 | 0<br>+1 | 0<br>+1 | Y2 |
| 0<br>+1 | +1<br>+1 | +1<br>0 | 0<br>0 | 0<br>0 | −1<br>0 | −1<br>+1 | 0<br>+1 | Y1 |
| +1<br>+1 | +1<br>0 | +1<br>0 | 0<br>0 | 0<br>0 | −1<br>0 | −1<br>0 | −1<br>+1 | Y0 |

Y DIRECTION − → +

− → +
X DIRECTION

VEHICULAR INPUT DEVICE CAPABLE OF BEING ADJUSTED TO CONFORM TO THE PHYSICAL CONSTITUTION OF THE OPERATOR

BACKGROUND OF THE INVENTION

1. Field of the Invention

The present invention relates to a vehicular input device including a single manual operating unit for operating concentratively various electronic devices mounted on a vehicle. Particularly, the invention is concerned with means for improving the versatility and operability of the input device.

2. Description of the Related Art

Up-to-date automobiles are equipped with various electronic devices such as air conditioner, radio, television, CD player, and navigation system. If these electronic devices are each individually operated by operating controls which are provided in the electronic devices respectively, there may be an obstacle to driving the automobiles. For facilitating the selection of a desired function, e.g., ON-OFF switching, of a certain electronic device without obstructing safe driving, a vehicular input device has heretofore been proposed in which various operations of various electronic devices can be conducted by operating a single manual operating unit.

A conventional technique associated with such a vehicular input device will be described below with reference to FIGS. 16 to 19, of which FIG. 16 is an interior diagram of an automobile, showing an example of a vehicular input device, FIG. 17 is a side view of a vehicular input device proposed heretofore, FIG. 18 is a plan view of a manual operating unit used in the vehicular input device shown in FIG. 17, and FIG. 19 is a plan view of a guide plate incorporated in the vehicular input device shown in FIG. 17.

As shown in FIG. 16, the vehicular input device of this example, indicated at 100, is installed in a console box 200 which is disposed between the driver seat and the front occupant seat. The conventional vehicular input device 100 shown in FIG. 17 is mainly composed of a manual operating unit 110 (see FIG. 18) provided with two switches 111 and 112 for click as signal input means and three rotary variable resistors 113, 114, and 115; an XY table 120 which is operated in two directions orthogonal to each other (in the direction perpendicular to the paper surface in FIG. 17 and in the transverse direction in the same figure) by means of the manual operating unit 110; a stick controller 130 that functions as a position signal input means which inputs signals to an external device in accordance with an operating direction of the XY table 120 and the amount of operation of the same table; and a guide plate 140 (see FIG. 19) which is engaged with an engaging pin 160 projecting from a lower surface of the XY table 120.

The manual operating unit 110 and the XY table 120 are rendered integral with each other through a connecting shaft 150. The XY table 120 and the guide plate 140 are engaged with each other by inserting a lower end portion of the engaging pin 160 movably into a guide groove 141 formed in the guide plate 140. The guide groove 141 can be set in a desired shape which permits the lower end portion of the engaging pin 160 to move in a specific direction. For example, as shown in FIG. 19, a guide groove 141 which is cross-shaped in plan may be formed in an upper surface of the guide plate 140 so that the lower end portion of the engaging pin 160 can be moved up to end portions of B, C, D, and E in two generally orthogonal directions from a center A. More specifically, by operating the manual operating unit 110 the engaging pin 160 can be moved along the guide groove 141 of the guide plate 140 through the XY table 120, and with the lower end portion of the engaging pin 160 positioned in any of the end points A, B, C, D, and E in the guide groove 141, information (a position signal) on that engaged position is outputted from the stick controller 130. Therefore, by utilizing such a position signal, a function (a function to be adjusted) of an electronic device mounted on a vehicle can be selected in an alternative manner. After a desired function of the electronic device has thus been selected, it is possible to make adjustment or switching of the selected function by suitably operating the three rotary variable resistors 113 to 115 provided in the manual operating unit 110.

As shown in FIG. 16, the vehicular input device 100 thus constructed is combined with a switch unit 170 which selects a desired electronic device alternatively from among plural electronic devices mounted on the vehicle, a display 180 which displays the name of the electronic device selected by the switch unit 170 and the contents of operation performed by the vehicular input device 100, and further with a computer (not shown) which controls those devices. As a result, the plural electronic devices can be operated in a concentrative manner. The switch unit 170 is installed in a console box 200 and is provided with operating switches 171*a* to 171*e* which are disposed near the vehicular input device 100 and which are connected each independently to different electronic devices. For example, if the operating switches 171*a* to 171*e* are connected each independently to air conditioner, radio, television, CD player, and navigation system, which are mounted on the vehicle, ON-OFF switching of the air conditioner and designation of an air conditioner mode for the vehicular input device 100 can be done by operating the operating switch 171*a*, and ON-OFF switching of the radio and designation of a radio mode for the vehicular input device 100 can be done by operating the operating switch 171*b*. Likewise, by operating the other operating switches 171*c* to 171*e* it is possible to effect ON-OFF switching of the corresponding electronic devices and mode designation for the vehicular input device 100. The display 180, e.g., a liquid crystal display, is installed in a position easy to see from the driver seat, while the computer referred to above is installed within the. console box 200.

The selection and adjustment of a function of the electronic device selected by the switch unit 170 can be done by operating the vehicular input device 100, but the function capable of being selected and adjusted by operation of the vehicular input device 100 differs depending on the type of the selected electronic device. For example, when the air conditioner mode has been designated by operating the switch unit 170, if the engaging pin 160 is positioned in the end portion B of the guide groove 141 of the guide plate 140 by operating the manual operating unit 110 and if the clicking switch 111 is depressed for clicking, there is selected an "air volume adjust" function, while if the engaging pin 160 is positioned in the end portion C of the guide groove 141 and the switch 111 is clicked, there is selected an "air blow-off position adjust" function. Likewise, if the switch 111 is clicked with the engaging pin 160 positioned in the end portions D and E of the guide groove 141, there are selected "air blow-off direction adjust" and "temperature adjust" functions.

After the selection of functions, the functions can be adjusted by suitably operating the rotary variable resistors 113 to 115. For example, with the air conditioner mode designated by the switch unit 170 and "air volume adjust"

selected by the manual operating unit 110, the air volume in the air conditioner can be adjusted by operating the rotary variable resistor 113. Likewise, when "air blow-off position adjust" is selected in the air conditioner mode, the air blow-off position from the air conditioner can be adjusted by operating the rotary variable resistors 114 and 115. When the radio mode is designated by the switch unit 170 and "volume adjust" selected by the manual operating unit 110, the volume of the radio can be adjusted by operating the rotary variable resistor 113. Further, "tuning" is selected in the radio mode, tuning of the radio can be done by operating the rotary variable resistors 114 and 115.

The conventional vehicular input device 100 is installed in a console box 200 which is provided between the driver seat and the front occupant seat in the automobile concerned. Once installed, the mounting posture of the input device for the console box 200 cannot be changed. Consequently, for some particular physical constitution and form of a vehicular driver or occupant, the operability of the input device may be poor and it may be impossible to make the most of the convenience of the input device.

SUMMARY OF THE INVENTION

The present invention has been accomplished for solving the above-mentioned problem of the prior art and it is an object of the invention to provide a vehicular input device for which the mounting posture can be adjusted to conform with the physical constitution and form of an operator and which is superior in both versatility and operability.

According to the present invention, for solving the above-mentioned problem, there is provided a vehicular input device comprising a housing, a manual operating unit mounted on an upper surface of the housing, a position sensor which outputs a position signal corresponding to the direction and amount that the manual operating unit is operated, and a plurality of push-button switches arranged on the upper surface of the housing, wherein the mounting posture of the housing in the interior of an automobile can be adjusted freely by the manual operating unit after the initial mounting of the housing.

According to this construction, since the mounting structure of the housing in the interior of an automobile can be adjusted freely in conformity with the physical constitution and form of an operator, it becomes possible to utilize various components conveniently and thus the versatility and operability of the vehicular input device are improved.

Preferably, the mounting posture of the housing in the interior of the automobile can be adjusted by operating the manual operating unit and push-button switches mounted on the housing.

By so doing, it is not necessary to use any special device for controlling the posture of the housing and the whole of the vehicular input device can be constructed compactly.

The position sensor and the push-button switches may be electrically connected to a display through a computer both provided in the automobile to display on the display the mounting posture of the housing which is adjusted by operating the manual operating unit and the push-button switches both mounted on the housing, as well as the operation of the manual operating unit.

In this case, the operator can adjust the mounting posture of the housing while checking the displayed contents on the display and therefore can control the posture of the housing quickly and positively.

BRIEF DESCRIPTION OF THE DRAWINGS

FIG. 10 is a table showing an example of a data table stored in memory provided in a computer;

DETAILED DESCRIPTION OF A PREFERRED EMBODIMENT

A vehicular input device according to an embodiment of the present invention will be described hereinunder with reference to the accompanying drawings.

Figure 1:
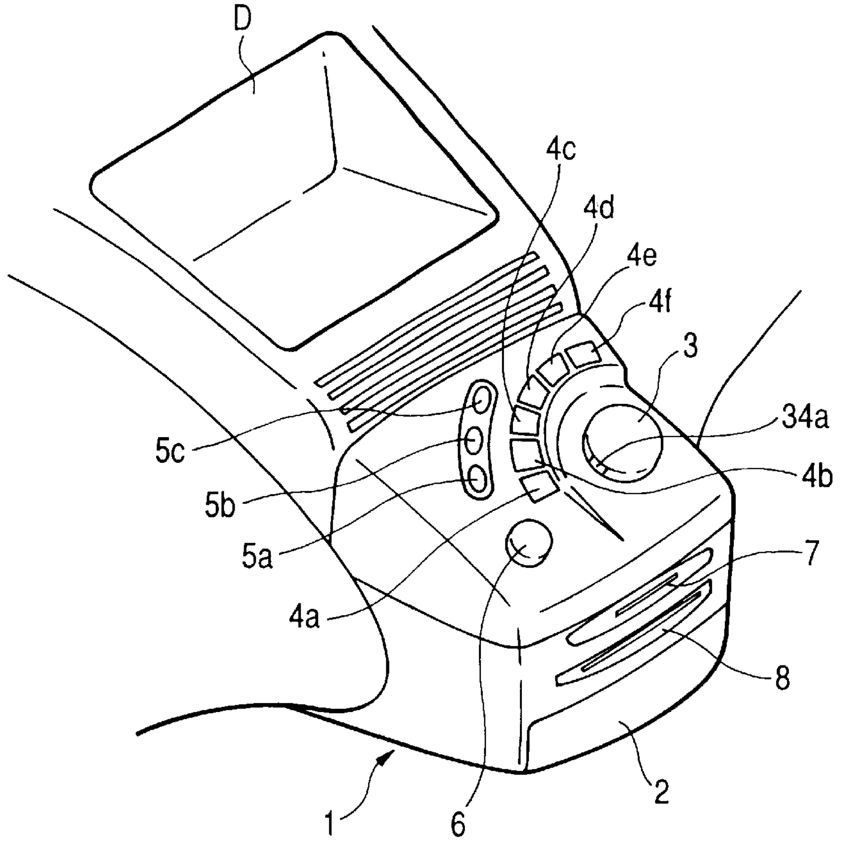
FIG. 1 is a perspective view of a vehicular input device according to an embodiment of the present invention as attached to a dash board.
Figure 2:
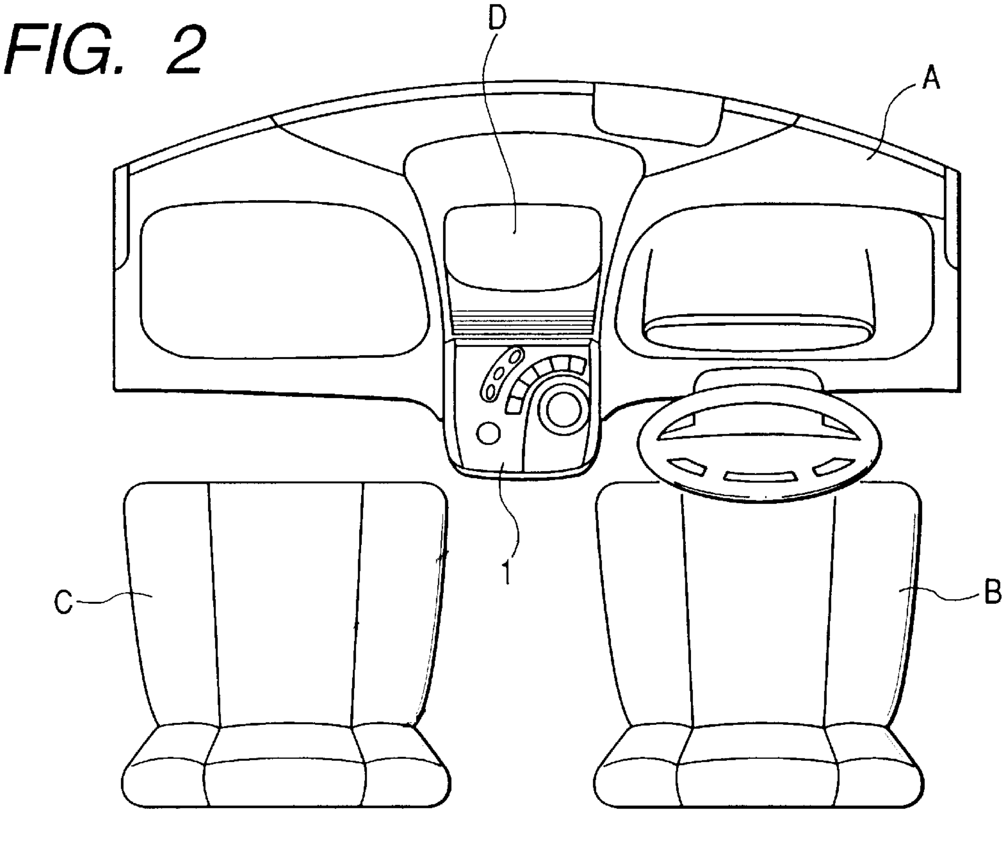
FIG. 2 is a plan view showing the interior of an automobile in which the vehicular input device is installed.

FIG. 1 is a perspective view showing how the vehicular input device of this embodiment is attached to a dash board, and FIG. 2 is a plan view showing the interior of an automobile in which the vehicular input device is installed. As is seen from FIG. 1, the vehicular input device of this embodiment, indicated at 1, has a housing 2 which is formed in the shape of a square vessel of the required size. On an upper surface of the housing 2 are arranged a manual operating unit 3, six push-button switches 4*a*, 4*b*, 4*c*, 4*d*, 4*e*, and 4*f* which are arranged arcuately around the manual operating unit 3, three push-button switches 5*a*, 5*b*, and 5*c* which are arranged along and concentrically with an outer peripheral portion of the six push-button switches, and a volume control 6. In the front side of the housing 2 are formed a card slot 7 and a disc slot 8. As shown in FIG. 2, the vehicular input device is attached to a dash board A of the automobile at a position between a driver seat B and a front occupant seat C. The vehicular input device can exhibit a required function in cooperation with a display D installed on the dash board A and a computer (not shown) accommodated within the dash board.

A total of nine push-button switches 4*a*, 4*b*, 4*c*, 4*d*, 4*e*, 4*f*, 5*a*, 5*b*, and 5*c* referred to above are connected to vehicular electronic devices, e.g., air conditioner, radio, television, CD player, and car navigation system, respectively, which are to be operated with use of the vehicular input device 1. The push-button switch to which an electronic device is to be connected can be determined arbitrarily, but in the vehicular input device 1 of this embodiment, the push-button switch 4*a* is connected to Menu Select, the push-button switch 4*b* is connected to a telephone, the push-button switch 4*c* is connected to an air conditioner, the push-button switch 4*d* is connected to a car navigation system, the push-button switch 4*e* is connected to a radio, the push-button switch 4*f* is connected to a card reader/writer or a disc drive, the push-button switch 5*a* is connected to Posture Control in the vehicular input device 1, the push-button switch 5*b* is connected to ON-OFF Control for a liquid crystal shutter provided throughout the whole surface of the display D, and the push-button switch 5*c* is connected to a television. By depressing the knob of a desired push-button switch, the vehicular electronic device connected to the depressed push-button switch can be selected. For preventing an erroneous operation, on the surface of the knob of each push-button switch is displayed (not shown) a character or a pictorial symbol which represents the electronic device connected to the corresponding switch.

Figure 3:
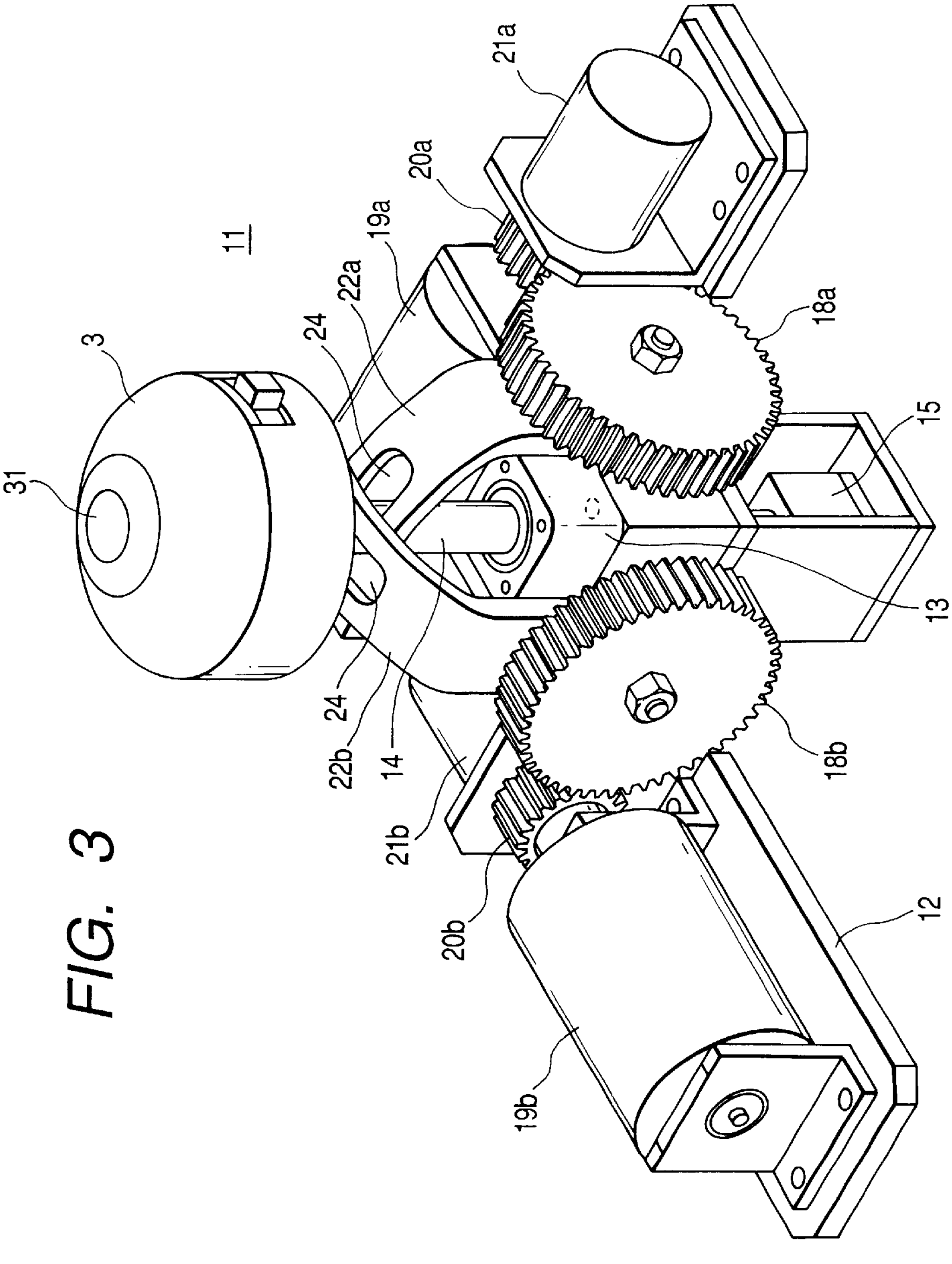
FIG. 3 is a perspective view of a manual operating unit and a mechanical portion in which the manual operating unit is installed.
Figure 4:
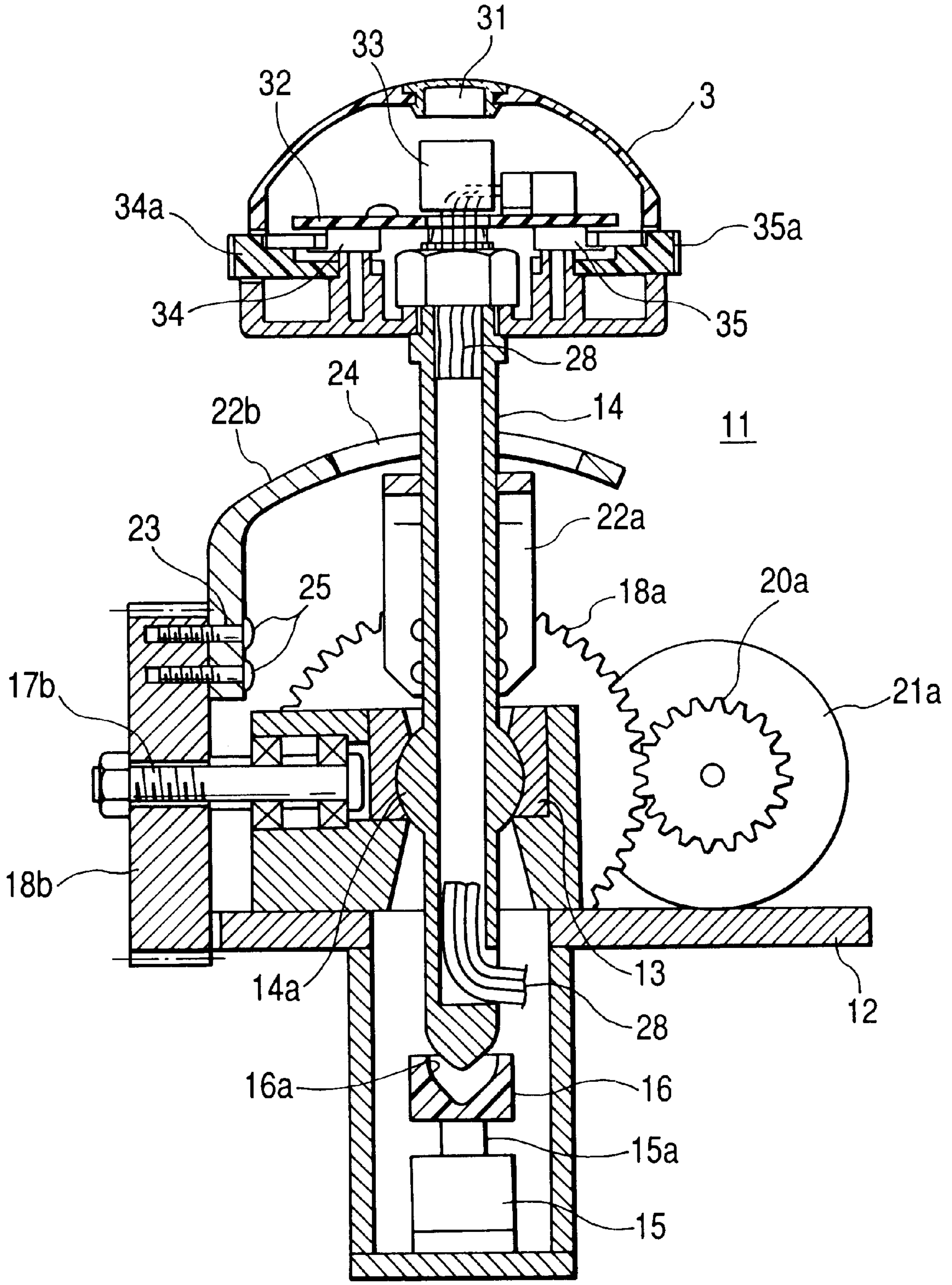
FIG. 4 is a sectional view of principal portions of the manual operating unit and the mechanical portion as seen sideways.
Figure 5:
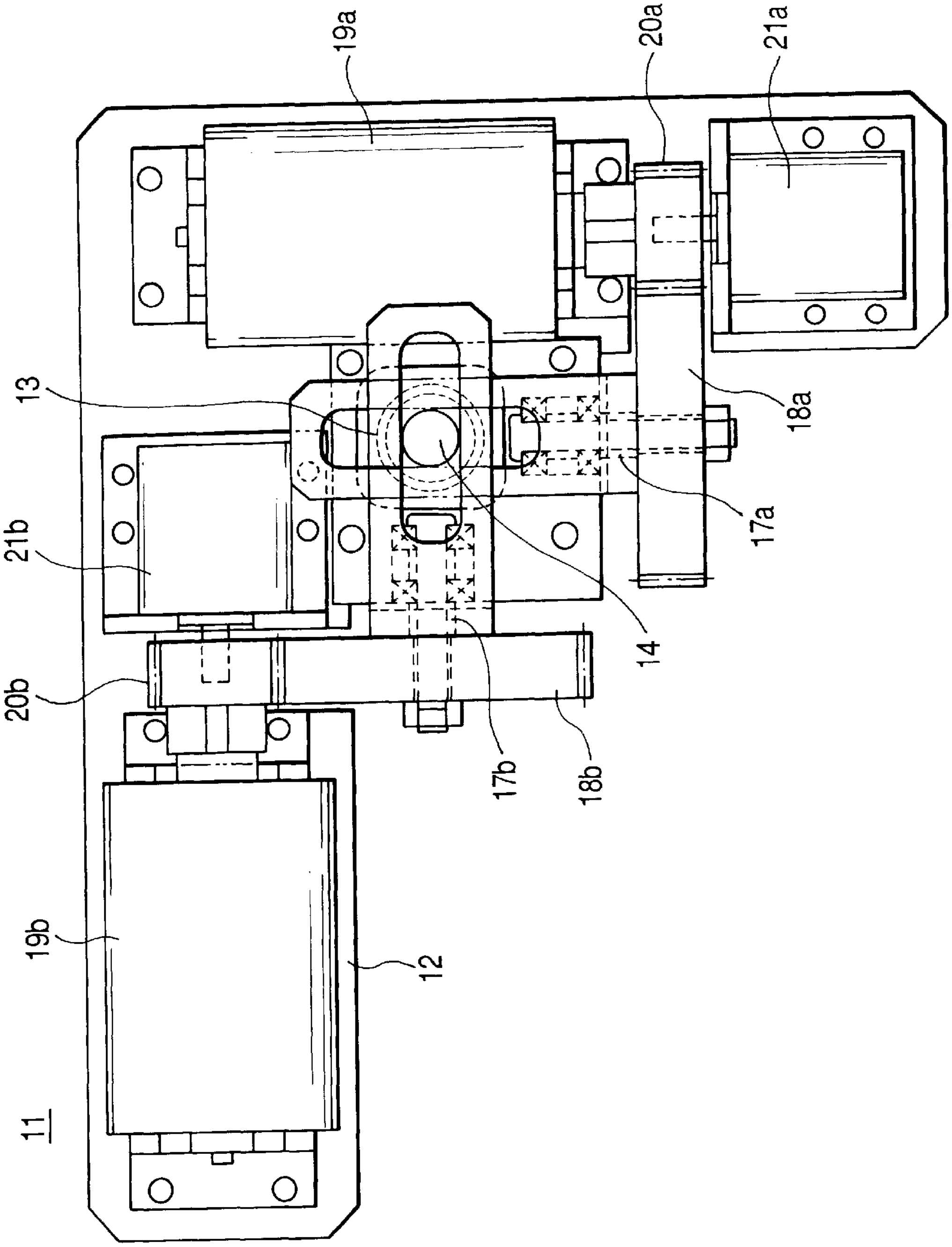
FIG. 5 is a plan view of the mechanical portion.
Figure 6:
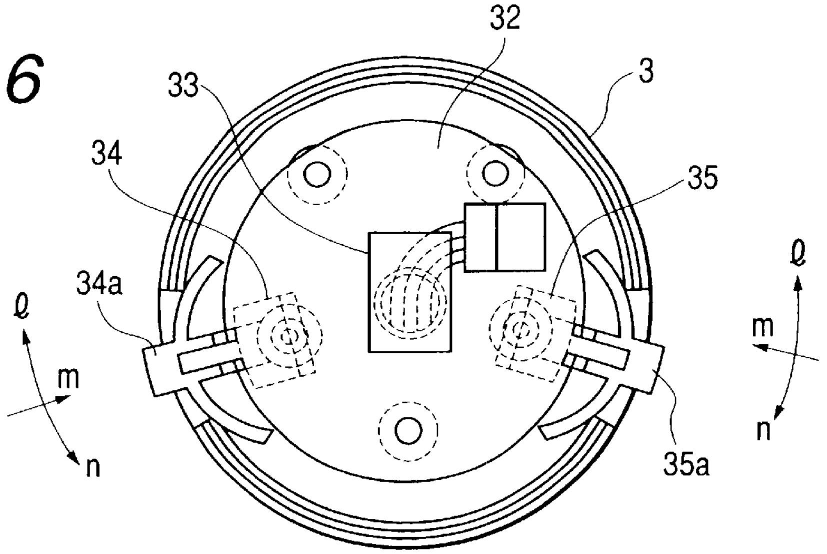
FIG. 6 is a plan view of the manual operating unit with a cover removed.

FIG. 3 is a perspective view of the manual operating unit 3 and a mechanical portion 11 in which the manual operating unit is provided. FIG. 4 is a sectional view of the principal portions of the manual operating unit 3 and the mechanical portion 11, as seen sideways. FIG. 5 is a plan view of the mechanical portion 11, and FIG. 6 is a plan view of the manual operating unit 3 with a cover removed.

As is seen from FIGS. 3 to 5, the mechanical portion 11 comprises a base 12 attached to a bottom of the housing 2, a spherical bearing 13 disposed on the base 12, a pivot shaft 14 having a spherical portion 14*a* positioned somewhat downward relative to a middle position, the spherical portion 14*a* being supported pivotably by the spherical bearing 13, a solenoid 15 disposed below the spherical bearing 13, a clamp member 16 for clamping the pivot shaft 14, the clamp member 16 being mounted on an upper end portion of a drive shaft 15*a* of the solenoid 15, two rotary shafts 17*a* and 17*b* which are disposed on axes perpendicularly intersecting each other in a plane parallel to the base 12, centered at the spherical bearing 13, two large gears 18*a* and 18*b* fixed respectively to distal ends of the rotary shafts 17*a* and 17*b*, two electric motors 19*a* and 19*b* disposed in parallel with the rotary shafts 17*a* and 17*b*, respectively, two small gears 20*a* and 20*b* fixed onto main shafts of the electric motors 19*a* and 19*b*, respectively. Engaged with the large gears 18*a* and 18*b*, respectively, are two encoders 21*a* and 21*b* for detecting the direction and amount of rotation of the main shafts of the electric motors 19*a* and 19*b*, and L-shaped members 22*a* and 22*b* which convert pivotal motions in X and Y directions (see FIG. 5) of the pivot shaft 14 into rotations in X and Y directions and transmit the rotations to the rotary shafts 17*a* and 17*b*. The manual operating unit 3 is mounted on an upper end portion of the pivot shaft 14.

A lower end portion of the pivot shaft 14 is formed in a conical shape which is smaller toward the bottom, while in an upper surface of the clamp member 16 opposed to the lower end portion of the pivot shaft 14 there is formed a generally conical depression 16*a* which permits insertion therein of the lower end portion of the pivot shaft 14. Therefore, when the solenoid 15 is turned ON to raise the clamp member 16, the lower end portion of the pivot shaft 14 is inserted into the depression 16*a* and is clamped, whereby its pivotal motion around the spherical portion 14*a* is inhibited. On the other hand, when the solenoid 15 is turned OFF to bring down the clamp member 16, the pivot shaft 14 and the clamp member 15 are disengaged from each other, making the pivot shaft 14 pivotable around the spherical portion 14*a*. As to ON-OFF operation of the solenoid 15, it will be described later.

As the large gears 18*a*, 18*b* and small gears 20*a*, 20*b* there may be used ordinary gears conforming to the standard concerned, but particularly preferable is using gears which have been improved to eliminate backlash. According to one method for eliminating backlash, an elastic member such as rubber is attached to the addendum portions of the large gears 18*a*, 18*b* and/or small gears 20*a*, 20*b*, allowing both gears to be engaged with each other through the elastic member.

In one side of each of the L-shaped members 22*a* and 22*b* is formed a tapped hole 23, while in the opposite sides thereof are respectively formed elongated through holes 24 for the pivot shaft. As shown in FIG. 4, with the pivot shaft 14 inserted through the through holes 24, one side of each of the L-shaped members 22*a* and 22*b* is clamped respectively to side faces of the large gears 18*a* and 18*b* with machine screws 25 fitted in the tapped holes 23. The width of each through hole 24 for the pivot shaft is preferably set at a value close to the diameter of the pivot shaft 14 insofar as a smooth sliding motion of the pivot shaft can be ensured. The length of each through hole 24 is set at a value equal to or larger than the movable range of the pivot shaft 14. Therefore, when the vehicle driver grasps the manual operating unit 3 and causes the pivot shaft 14 to move pivotally from the center position, the L-shaped members 22*a* and 22*b* turn by an amount proportional to X-and Y- direction components of the manual operating unit and this rotation is transmitted to the encoders 21*a* and 21*b* through the large gears 18*a*, 18*b* and small gears 20*a*, 20*b*. The direction and amount of rotation of the pivot shaft 14 are detected by the computer installed within the dash board.

As shown in FIGS. 3 and 4, the manual operating unit 3 is formed in a dome shape having a transparent window 31 in a top central position. In the interior of the manual operating unit 3, as shown in FIGS. 4 and 6, are disposed a circuit board 32, a photointerrupter 33 mounted on the circuit board 32 at a position opposed to the transparent window 31, the photointerrupter 33 being constituted by a combination of a light emitting element and a light receiving element, and first and second switches 34, 35 mounted in a peripheral portion of the circuit board 32.

The photointerrupter 33 is for controlling ON and OFF of the solenoid 15. When a specific wavelength of light, e.g., infrared light, is radiated from a light emitting element (not shown) and is incident on a light receiving element (not shown), the solenoid 15 is turned ON, causing the clamp member 16 to move down and become disengaged from the clamp member, thereby permitting a pivotal operation of the pivot shaft 14. The supply of electric power to the photointerrupter 33 and the transmission of a signal from the photointerrupter are performed through a cord inserted into the pivot shaft 14.

As the first and second switches 34, 35 there are used switches having the function of a rotation detecting switch and the function of a depression detecting switch and each having a knob located at a central position when the switch is not operated. The applicant in the present case has previously proposed this type of switches. As shown in FIG. 6, first and second knobs 34*a*, 35*a* for operating the first and second switches 34, 35 are positioned symmetrically right and left in an outer peripheral surface of the manual operating unit 3. The knobs 34*a* and 35*a* can be turned in the direction of arrow l or n from a center position along the outer peripheral surface of the manual operating unit 3 and can also be pushed in the direction of arrow m.

The first and second switches 34, 35 are constructed so that the direction in which the first and second knobs 34*a*, 35*a* are operated match the resulting switched-over function. To be more specific, the first and second switches 34, 35 are used for switching over from one to another function of a vehicular electronic device which is selected by operating any of the push-button switches 4*a*, 4*b*, 4*c*, 4*d*, 4*e*, and 4*f* mounted on the upper surface of the housing 2. When both first and second switches 34, 35 are operated in the same direction, the selected electronic device is switched over to the same function. For example, it is here assumed that the air conditioner mode has been selected by operating the push-button switch 4*c*. In this case, when both first and second switches 34, 35 operate the first and second knobs 34*a*, 35*a* in the direction of arrow l, the temperature set for the air conditioner rises, while when the first and second knobs 34*a*, 35*a* are operated in the direction of arrow n, the set temperature for the air conditioner drops, and when both knobs 34*a* and 35*a* are operated in the direction of arrow m, the air conditioner is controlled ON or OFF.

That the direction in which the first and second knobs 34*a*, 35*a* are operated and the resulting switched-over function are made corresponding to each other, is advantageous in the following point. Not only where the vehicular input device of this embodiment is installed in a right-handed steering wheel vehicle, but also where it is installed in a left-handed steering wheel vehicle, the same functional switching can be made by operating knobs in the same direction which knobs are in the same positional relation when seen from the vehicle driver side. Therefore, it is difficult for the vehicle driver to make a mistake in operation, and the vehicular input device of the same construction can be applied to both right- and left-handed steering wheel vehicles, whereby the versatility of the vehicular input device is enhanced. Further, by using the first knob 34*a* and the second knob 35*a* properly, the switches disposed in the manual operating unit 3 can be operated with the same sense from both the driver seat and the front occupant seat, so that it is difficult for the vehicle driver to make a mistake in operation and it is possible to enhance the operability of the vehicular input device.

The electric motors 19*a* and 19*b* are for imparting a resistance feeling to the operation of the manual operating unit 3. For example, both motors are used for restricting the operating direction of the manual operating unit 3, restricting the operating speed proportional to the amount of operation of the manual operating unit 3, and restricting a stop point of the manual operating unit.

More specifically, by moving pivotally in a specific direction, the manual operating unit 3 selects a vehicular electronic device to be controlled and adjust the function of the selected electronic device. Therefore, if the manual operating unit 3 cannot perform operation accurately in a predetermined direction, it is impossible to make an accurate selection of an electronic device and adjustment of its function. Operation of the manual operating unit 3 in the predetermined direction can be done with a small operational force, but for operation of the manual operating unit in a direction other than the predetermined direction, the electric motors 19*a* and 19*b* are driven to impose a torque on the pivot shaft 14 in a direction opposite to the operational direction, thereby imparting a resistive feeling to the operation of the manual operating unit. By so doing, the operator can become aware sensibly that he or she has operated the manual operating unit 3 in a direction other than the predetermined direction. Thus, it is possible to prevent the occurrence of an error in the selection of a vehicular electronic device or in the adjustment of function.

In the case where a functional adjustment of a vehicular electronic device is to be made by operating the manual operating unit 3, for example, where the temperature set for the air conditioner is to be changed, if the amount of operation of the manual operating unit is small, the switching of the set temperature to another set temperature is done slowly, while if the amount of operation of the manual operating unit 3 is made large, the switching of the set temperature is done at high speed. In this connection, if there is no resistive feeling in the operation of the manual operating unit 3, the amount of operation of the manual operating unit 3 is apt to become large and hence it becomes difficult to make a minor change of the set temperature accurately and quickly, thus resulting in deterioration of the operability. To avoid such an inconvenience, when the amount of operation of the manual operating unit 3 has increased to a certain extent, the electric motors 19*a* and 19*b* are driven to impose a torque on the pivot shaft 14 in a direction opposite to the operational direction, thereby imparting a resistive feeling to the operation of the manual operating unit. As a result, the operator can become aware sensibly that the amount of operation of the manual operating unit 3 is too large and it is impossible to make a fine adjustment of the set temperature for the air conditioner. Therefore, by making small the amount of operation of the manual operating unit 3 it is possible to make a fine adjustment of the set temperature for the air conditioner in an accurate and quick manner. Instead of the construction wherein a resistive feeling is imparted to the operation of the manual operating unit 3 when the amount of operation of the manual operating unit has increased to a certain extent, there may be adopted a construction wherein different resistive feelings are imparted successively to the manual operating unit 3 in proportion to the amount of operation of the manual operating unit. Although in the above example the temperature set for, for example, the air conditioner increases as the amount of operation of the manual operating unit 3 increases, also in the case where the adjusting speed increases with an increase in the operating speed of the manual operating unit, a resistive feeling can be imparted to the manual operating unit by the same method as above.

Further, as means for restricting an operation limit of the manual operating unit 3, if there is adopted a mechanical method, for example a method wherein the pivot shaft 14 is brought into abutment against an edge of the spherical bearing 13, a large mechanical force is exerted on the abutment between the spherical bearing 13 and the pivot shaft 14 at every operation of the manual operating unit 3, causing wear, so that the resulting dust gets in between the spherical bearing 13 and the spherical portion 14*a* of the pivot shaft 14, with consequent increase in the operating force of the pivot shaft. In the worse case, it becomes impossible for the pivot shaft 14 to perform its pivotal motion. For avoiding the occurrence of such inconveniences, the electric motors 19*a* and 19*b* are driven when the manual operating unit 3 has been operated up to a predetermined position, to impose, for example, a shocking torque on the pivot shaft 14 in a direction opposite to the operational direction. By so doing, the operator can become aware sensibly that the manual operating unit 3 has been operated up to its operation limit. Consequently, a further operation of the manual operating unit 3 can be stopped; besides, the abutment between an edge of the spherical bearing 13 and the pivot shaft 14 is prevented and hence the generation of wear dust is diminished, that is, the above inconvenience that caused the generation of wear dust can be prevented. Further, with the torque of the electric motors 19*a* and 19*b*, the manual operating unit 3 can be returned to the center position automatically and therefore the operability of the manual operating unit can be improved.

Figure 11:
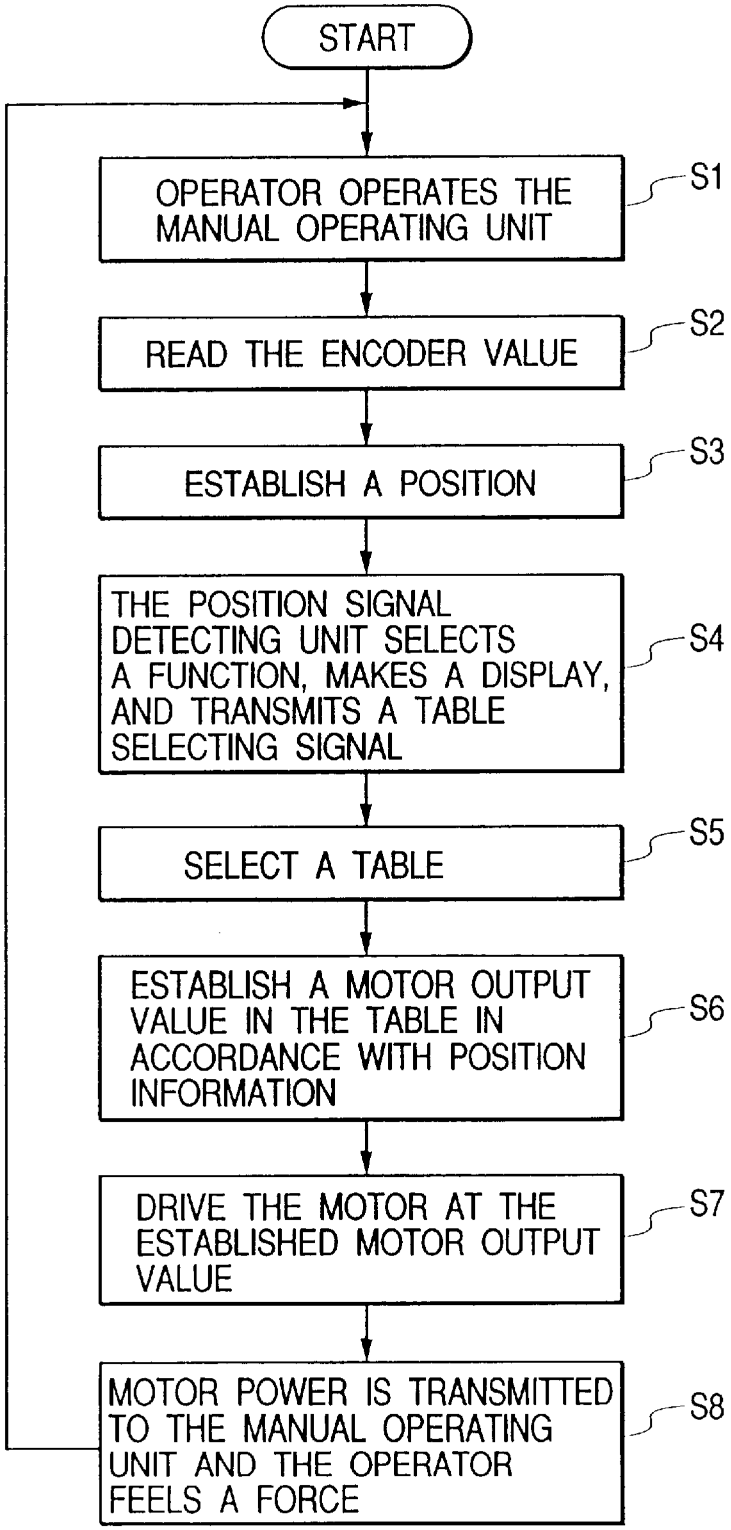
FIG. 11 is a flow chart showing a control procedure for the electric motors.

The electric motors 19*a* and 19*b* are controlled in accordance with a command issued from a computer installed within the dash board A. How to control the electric motors 19*a* and 19*b* by the computer will be described below with reference to FIGS. 7 to 11, of which FIG. 7 is an explanatory diagram showing in which directions the manual operating unit 3 is operated, as well as the type of a vehicular operating unit selected by operation of the manual operating unit. FIG. 8 is a diagram showing in which directions the manual operating unit 3 is operated, as well as the type of functions which are switched over from one to another by operation of the manual operating unit. FIG. 9 is a block diagram showing a control system for the electric motors 19*a* and 19*b*. FIG. 10 is a table showing an example of a data table which is stored in memory provided in a computer, and FIG. 11 is a flow chart showing a control procedure for the electric motors 19*a* and 19*b*.

Figure 7A:
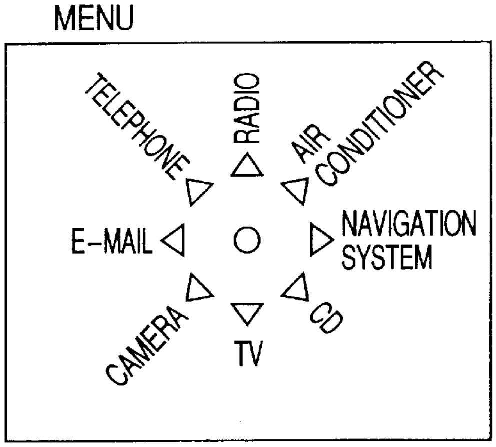
FIGS. 7A and 7B are explanatory diagrams showing operational directions of the manual operating unit and the types of vehicular electronic devices which are selected by the manual operating unit.
Figure 7B:
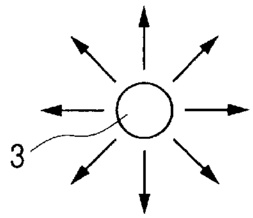

In the vehicular input unit 1 of this embodiment, as shown in FIGS. 7A and 7B, the manual operating unit 3 is adapted to be operated in front, right front, right, right rear, rear, left rear, left, and left front directions with respect to the center position, whereby radio, air conditioner, car navigation system, CD player, television, monitor camera, electronic mail, and telephone can be selected, respectively. As to the type of electronic devices selected by the push-button switches 4*a*, 4*b*, 4*c*, 4*d*, 4*e*, 4*f*, 5*a*, 5*b*, and 5*c* provided in the vehicular input device 1 and the type of electronic devices selected by operation of the manual operating unit 3, the same type of electronic devices may be combined together, or there may be combined different types of electronic devices. The latter combination of different types of electronic devices is adopted in this embodiment.

Figure 8A:
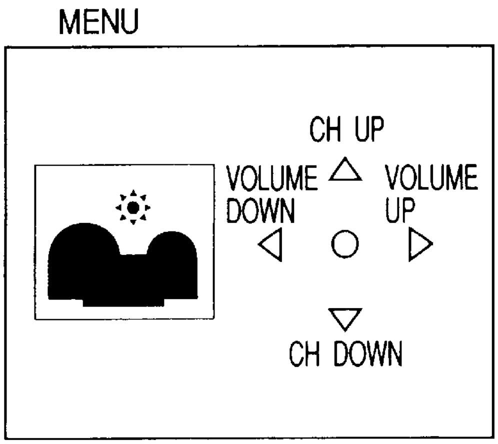
FIGS. 8A and 8B are explanatory diagrams showing operational directions of the manual operating unit and the types of functions which are switched over from one to another in accordance with in which direction the manual operating unit is operated.
Figure 8B:
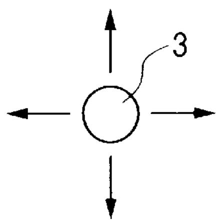
Figure 9:
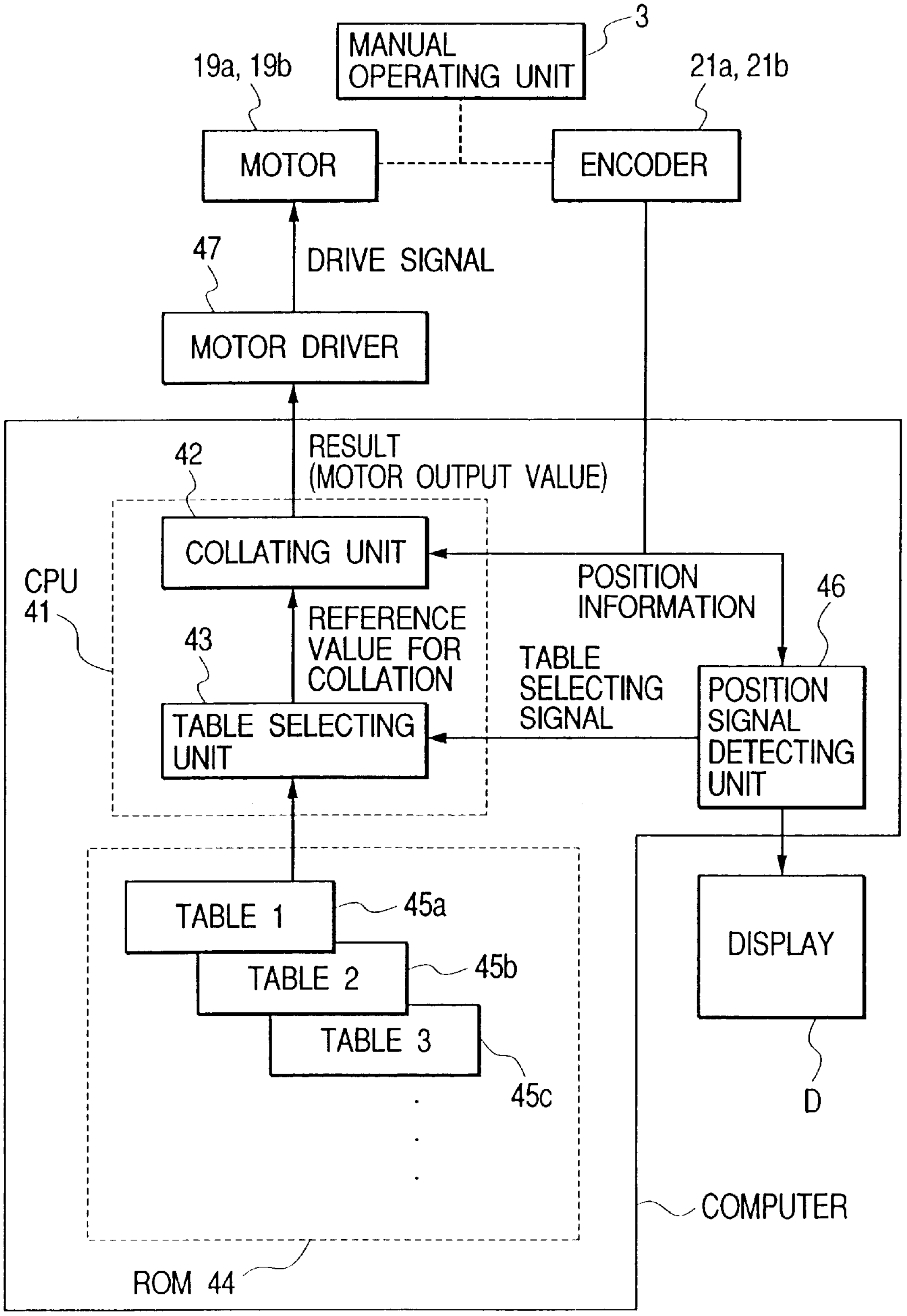
FIG. 9 is a block diagram showing a control system for electric motors.

In the case where TV is selected by operating the manual operating unit 3 rearwards with respect to the center position, there can be made such various functional adjustments as shown in FIG. 8A. That is, it is possible to make such functional adjustments as Channel Up by operating the manual operating unit 3 forward, Channel Down by operating the manual operating unit rearward, Volume Up by operating the manual operating unit rightward, and Volume Down by operating the manual operating unit leftward, all with respect to the center position.

Where the number of functions to be adjusted by operation of the manual operating unit 3 is less than "8" which is the maximum number of movable directions of the manual operating unit, if the manual operating unit is operated in a direction other than the directions allocated for functional adjustment (the directions shown in FIG. 8A), it is impossible to make a functional adjustment of the selected electronic device. If such an insensible portion is included in the operational range of the manual operating unit 3, the operator is required to operate the manual operating unit prudently in a direction in which the functional adjustment can be made. This is deficient in the easiness of operation and is not desirable from the standpoint of vehicular safe driving.

For solving the above problem, in the vehicular input device 1 of this embodiment, a control system for the electric motors 19*a* and 19*b* is constructed as in FIGS. 9 and 10, and the motors 19*a* and 19*b* are controlled in accordance with the procedure shown in FIG. 11.

More specifically, as shown in FIG. 9, a collating unit 42 and a table selecting unit 43 are provided in a CPU 41 of a computer installed within the dash board A, and in a ROM 44 disposed in the computer there are stored tables 45*a*, 45*b*, 45*c*, . . . of coded data on the operational region of the manual operating unit 3, as well as rotational directions of the electric motors 19*a* and 19*b* corresponding to the operational regions and the magnitudes of torques generated by rotation. The computer is further provided with a position signal detecting unit 46. The position signal detecting unit 46 inputs signals from the encoders 21*a* and 21*b*, outputs to the table selecting unit 43 a table selecting signal corresponding to an operational region in the manual operating unit 3, and displays the path of operation of the manual operating unit on the display D.

FIG. 10 shows an example of a table stored in the ROM 44. In this table, the movable range of the manual operating unit 3 is divided into eight equal regions in X direction and eight equal regions in Y direction, and coded data on ON-OFF and rotational directions of the electric motors 19*a* and 19*b* in an operated state of the manual operating unit are displayed in the thus equally divided regions. In the table, the symbols and numerals described at the upper stage represent ON-OFF and rotational directions of the first electric motor 19*a*, while those described at the lower stage represent ON-OFF and rotational directions of the second electric motor 19*b*. The symbol "+" stands for a forward rotation of each motor, while the symbol "−" stands for a reverse rotation thereof. The numeral "0" represents that the electric motors 19*a* and 19*b* do not rotate, while the numeral "1" represents that both motors rotate. According to this table, if the manual operating unit 3 is operated in any of the regions (X3, Y0) to (X3, Y7), (X4, Y0) to (X4, Y7), (X0, Y3) to (X7, Y3), and (X0, Y4) to (X7, Y4), both electric motors 19*a* and 19*b* fail to rotate and a resistive feeling, which is created with rotation of the electric motors 19*a* and 19*b*, is not imparted to the motion of the manual operating unit 3. If the manual operating unit 3 is operated in any other region, at least one of the motors 19*a* and 19*b* rotates and a resistive feeling caused by the rotation of the motors is imparted to the motion of the manual operating unit.

Therefore, in the case where TV is first selected by operating the manual operating unit 3 and a functional adjustment of television can be made only when the manual operating unit is operated in the front, rear, right, or left direction with respect to its center position, as shown in FIG. 8A, if the rotation of the electric motors 19*a*and 19*b* is controlled using the table of FIG. 10 and if the manual operating unit 3 is operated in an oblique direction other than front, rear, right, and left directions with respect to the center position, at least one of the motors 19*a* and 19*b* rotates and a resistive feeling induced by the motor rotation is imparted to the motion of the manual operating unit, so that the operator can become aware sensibly that he or she is operating the manual operating unit 3 in an insensible region. Thus, it becomes possible for the operator to operate the manual operating unit in a direction in which a desired functional adjustment can be made, so that the ease of operation of the manual operating unit is improved without obstructing the driving of the vehicle.

The rotation of the electric motors 19*a* and 19*b* is controlled by the computer in accordance with the procedure shown in terms of a flow chart in FIG. 11.

When the operator operates the manual operating unit 3 in any direction with respect to the center position (step S1), the encoders 21*a* and 21*b* rotate in the turning direction of the manual operating unit by an amount of rotation proportional to the turning quantity of the manual operating unit via the L-shaped members 22*a*, 22*b*, large gears 18*a*, 18*b*, and small gears 20, 20*b*, and output position signals. The position signal detecting unit 46 provided in the computer reads these position signals (S2) and establishes an operational position of the manual operating unit 3 (S3). At the same time, the position signal detecting unit 46 sends a table selecting signal to the table selecting unit 43 and a position signal to the display D (S4). In accordance with the table selecting signal provided from the position signal detecting unit 46 the table selecting unit 43 in the CPU 41 selects and inputs a predetermined table from the ROM 44 (S5). Further, in accordance with the positions signals provided from the encoders 21*a* and 21*b* and the table inputted to the table selecting unit 43 the collating unit 42 in the CPU 41 establishes a motor output value and outputs it to a motor driver 47 (S6). The motor driver 47 drives the electric motors 19*a* and 19*b* in accordance with the motor output value, allowing a resistive feeling to be imparted to the motion of the manual operating unit 3 (S7). The operator gets the resistive feeling of the manual operating unit 3 and changes the operational position of the manual operating unit (S8).

These motor controlling means and method are applicable not only to restricting the operational direction of the manual operating unit 3 but also to imparting a resistive feeling proportional to the amount of operation of the manual operating unit to the motion of the same unit and further to imparting a resistive feeling at the operation limit of the manual operating unit.

Figure 12:
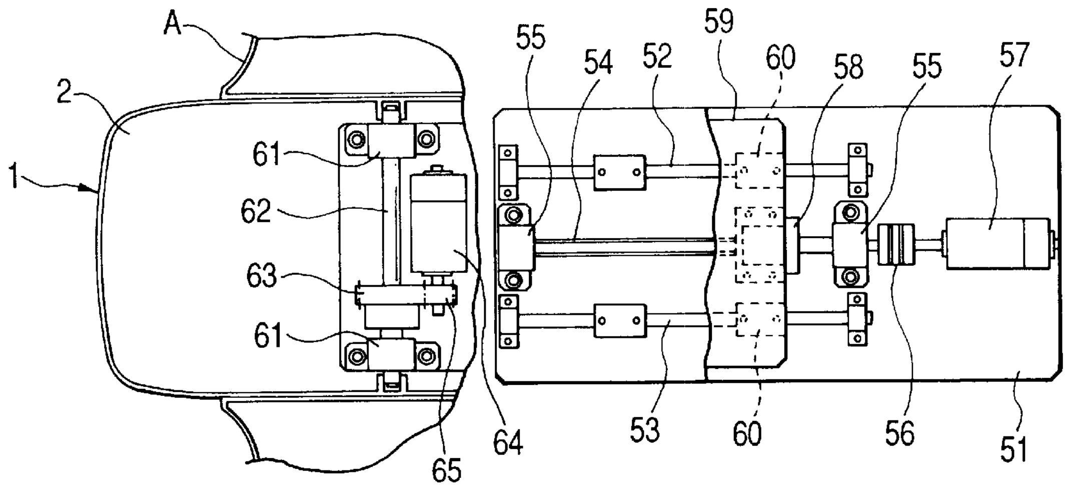
FIG. 12 is a partially cut-away diagram showing a mechanism for mounting the vehicular input device to the dash board, as seen in a planar direction.
Figure 13:
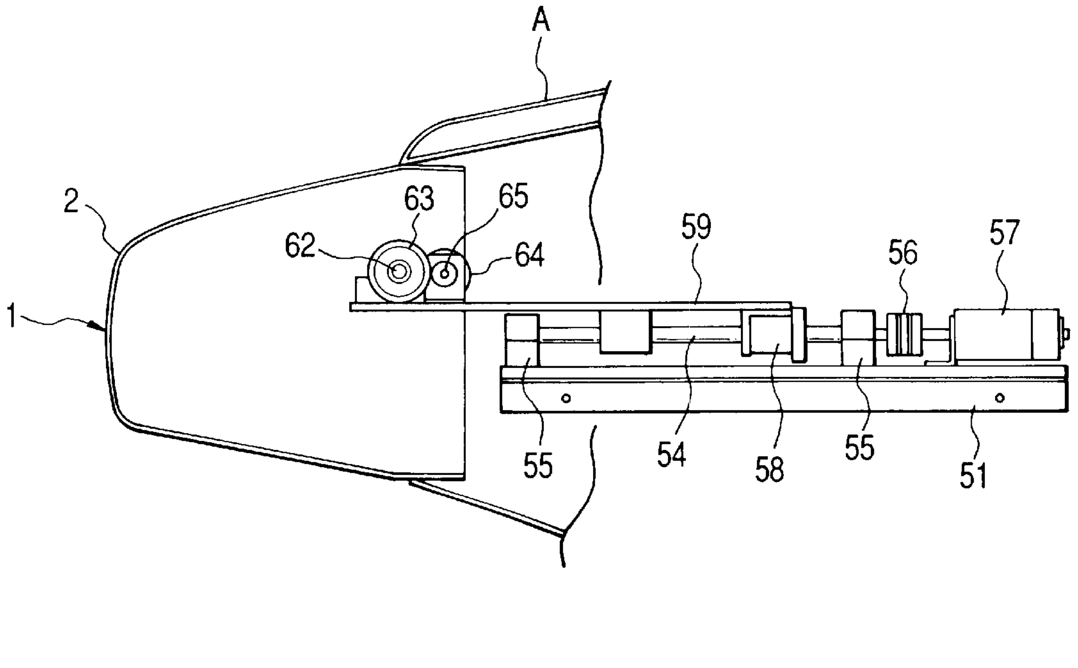
FIG. 13 is a partially cut-away diagram of the vehicular input device mounting mechanism as seen sideways.

The vehicular input device 1 of this embodiment constructed as above is attached to the vehicular dash board A so as to be movable back and forth and tiltable. FIG. 12 is a partially cut-away diagram as seen in a planar direction, showing a mounting mechanism for mounting the vehicular input device 1 to the dash board A, and FIG. 13 is a partially cut-away diagram of the mounting mechanism as seen sideways.

As is seen from these figures, on a base 51 provided within the dash board A are mounted two guide shafts 52 and 53 and one ball screw 54 in parallel with each other. The ball screw 54 is supported rotatably by means of a bearing 55 and a first motor 57 for forward and backward movement is connected to one end of the ball screw 54 through a joint 56. Further, a transfer plate 59 is connected to the ball screw 54 through a nut 58 so as to be movable forward and backward. The transfer plate 59 is also connected to the guide shafts 52 and 53 slidably through sliders 60. A rotary shaft 62, which is supported rotatably by bearings 61, is mounted to a front end portion of the transfer plate 59 at right angles to the guide shafts 52, 53 and the ball screw 54, and the housing 2 of the vehicular input device 1 is fixed to end portions of the rotary shaft 62. A large gear 63 is fixed onto the rotary shaft 62 and it is in mesh with a small gear 65 which is fixed onto a main shaft of a second motor 64.

Therefore, by rotating the first motor 57 forward or reverse, the vehicular input device 1 can be moved forward or backward with respect to the dash board A, and by rotating the second motor 64 forward or reverse, a front end portion of the vehicular input device can be turned upward or downward with respect to the dash board A. Thus, the posture of the vehicular input device 1 can be changed suitably so that the operator can easily operate the manual operating unit 3, various push-button switches 4*a* to 4*f*, 5*a* to 5*c*, and volume control. Consequently, it is possible to further enhance the operability of the vehicular input device 1.

Figure 14:
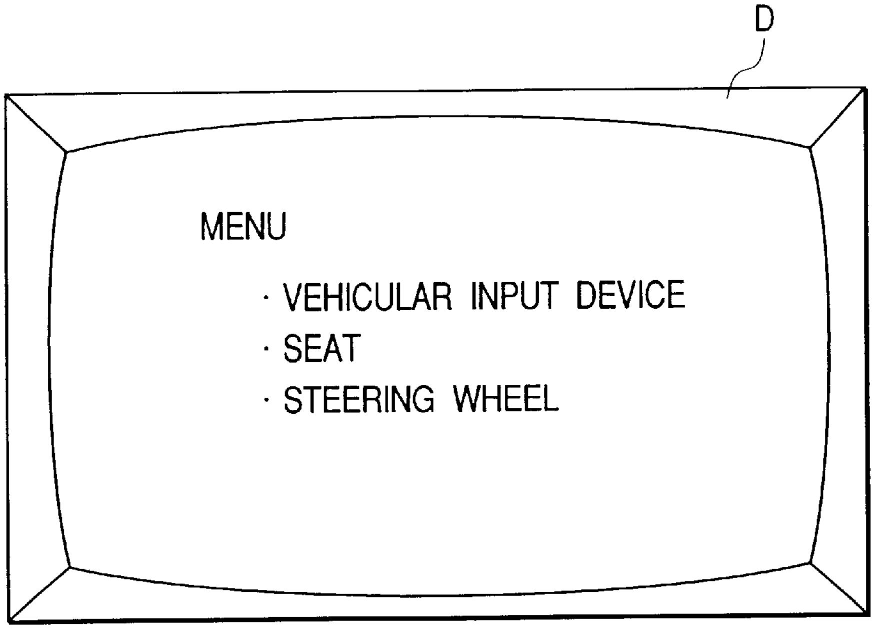
FIG. 14 is an explanatory diagram showing a menu of vehicular electronic devices displayed on a display.
Figure 15:
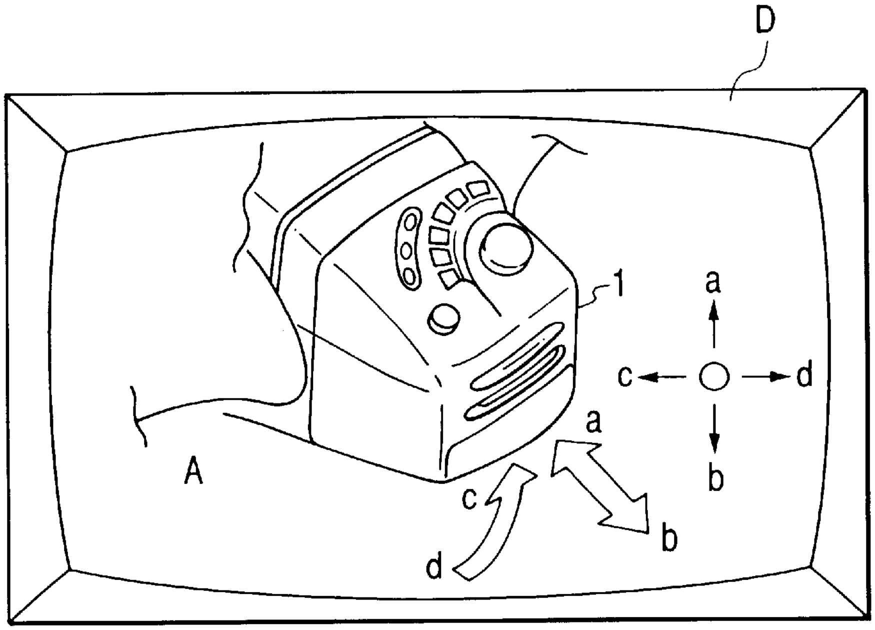
FIG. 15 is an explanatory diagram showing the state of a vehicular electronic device being adjusted its function which is displayed on the display.
Figure 16:
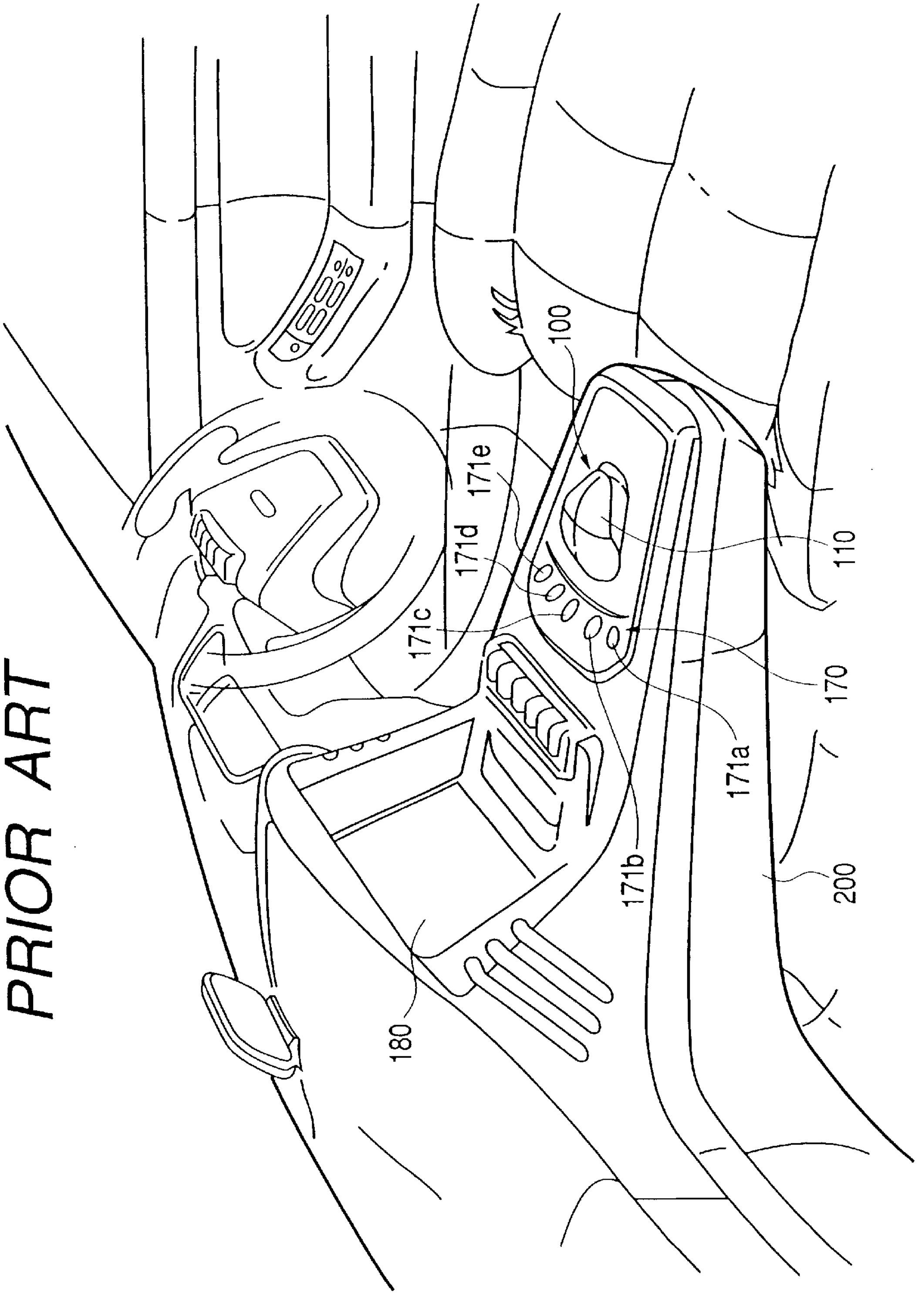
FIG. 16 PRIOR ART
FIG. 16 is an interior diagram of an automobile, showing an example, of installation of a conventional vehicular input device.
Figure 17:
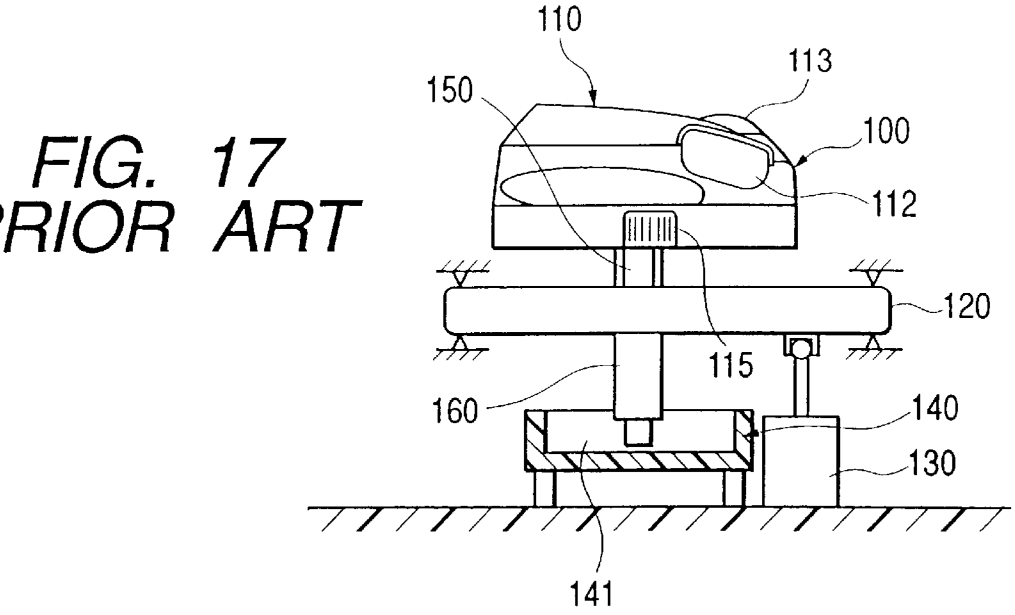
FIG. 17 PRIOR ART
FIG. 17 is a side view of a vehicular input device proposed heretofore.
Figure 18:
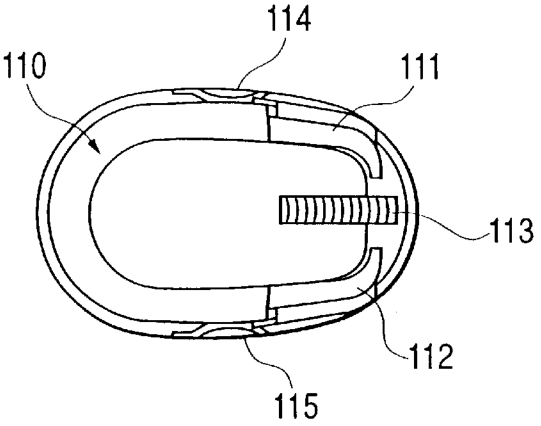
FIG. 18 PRIOR ART
FIG. 18 is a plan view of a manual operating unit in the vehicular input device shown in FIG. 17.
Figure 19:
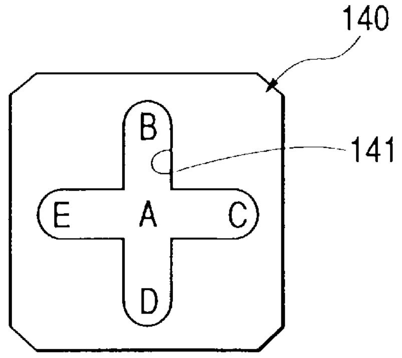
FIG. 19 PRIOR ART
FIG. 19 is a plan view of a guide plate incorporated in the vehicular input device shown in FIG. 17.

The posture of the vehicular input device 1 can also be controlled by operating the manual operating unit 3 and push-buttons 4*a* to 4*f*, 5*a* to 5*c* mounted on the vehicular input device. To be more specific, when the push-button switch 4*a*is depressed, such a menu as illustrated in FIG. 14 appears on the display D. If "Vehicular input device" is selected from the menu by operating the manual operating unit 3, such an image of the vehicular input device 1 as shown in FIG. 15 appears on the display D. In this state, if the manual operating unit 3 is operated in the direction of "Forward, a," the first motor 57 rotates forward and the vehicular input device 1 moved forward, while if the manual operating unit 3 is operated in the direction of "Backward, b," the first motor 57 rotates reverse and the vehicular input device 1 moves backward. If the manual operating unit 3 is operated in the direction of "Upward, c," the second motor 64 rotates forward and the front end portion of the vehicular input device turns upward about the rotary shaft 62, while if the manual operating unit is operated in the direction of "Downward, d," the second motor 64 rotates reverse and the front end portion of the vehicular input device 1 turns downward about the rotary shaft 62. If "Seat" is selected from the menu display, it is possible to adjust the comfortableness to sit on the driver seat and the front occupant seat in the same procedure,as above. If "Steering wheel" is selected from the menu display, it is possible to adjust the tilt and telescopic condition of the steering wheel and thereby adjust the height of the steering wheel in accordance with the same procedure as above.

In the case where the postures of the vehicular input device 1, seat and steering wheel are to be changed by operating the manual operating unit 3, it is particularly preferred to set the table so that the movable ranges of those components and the resistive feeling imparted to the manual operating unit are correlated with each other, for example the resistive feeling imparted to the manual operating unit 3 is gradually made stronger at an end in the movable range of a component, or a shocking resistive feeling is. imparted to the manual operating unit 3 upon reaching an end in the movable range. This makes utilization more convenient because the operator can become aware up to where in the movable range the component concerned has been adjusted.

Thus, in the vehicular input device 1 of this embodiment, a desired vehicular electronic device to be adjusted its function can be selected by operating the push-button switches 4*a* to 4*f* and 5*a* to 5*c* or by operating the manual operating unit 3, which are provided on the upper surface of the housing 2. By operating the manual operating unit 3 in a predetermined direction or by operating the first and second switches 34, 35 provided in the manual operating unit, after having selected a desired vehicular electronic device, it is possible to adjust the function of the electronic device. The radio, television, and CD player can be adjusted in their volume also by turning the volume control 6. A menu of vehicular electronic devices capable of being selected by the vehicular input device 1, a menu showing the contents of adjustable functions of the electronic devices, and operational directions of the manual operating unit, are displayed successively on the display D. When the manual operating unit 3 is not in operation, the pivot shaft 14 is clamped by the clamp member 16 to prevent the occurrence of undesirable vibration and noise of the manual operating unit 3 caused by vibration of the automobile. When the operator puts his or her finger above the manual operating unit 3, a specific wavelength of light emitted from the light emitting element in the photointerrupter 33 is applied to the light receiving element in the photointerrupter, whereby the solenoid 15 is turned ON to disengage the clamp member 16 from the pivot shaft 14. Consequently, the manual operating unit 3 becomes operable automatically.

Although in the above embodiment there was used a gear mechanism as a power transfer mechanism for transmitting the pivotal motion of the pivot shaft 14 to the encoders 21*a* and 21*b*, the gist of the present invention is not limited thereto and there may be used any other known power transfer mechanism such as a friction wheel or a belt mechanism.

Although in the above embodiment the encoders 21*a* and 21*b* were used as sensors for detecting the direction and amount of a pivotal motion of the pivot shaft 14, the gist of the present invention is not limited thereto, but there may be used any other known position sensor.

Although in the above embodiment the solenoid 15 was used as drive means for the clamp member 16, the gist of the present invention is not limited thereto, but there may be used such other means as electromagnet or a hydraulic or pneumatic actuator.

Although in the above embodiment the electric motors 19*a* and 19*b* were used as power sources for imparting a resistive feeling to the operation of the manual operating unit 3, the gist of the present invention is not limited thereto, but there may be used any other known actuator such as an air motor or a hydraulic motor.

Further, not only an actuator which generates a rotational force but also an actuator which generates a linear force such as a linear motor or a shaker may be used alone or in combination with a suitable power transfer mechanism.

In the vehicular input device according to the present invention, as set forth above, since the mounting structure of the housing in the interior of automobile can be freely adjusted after the mounting of the housing, it can be adjusted in conformity with the physical constitution or form of an operator and hence it becomes possible to utilize various components conveniently, whereby both versatility and operability of the vehicular input device can be improved.

Moreover, in the vehicular input device according to the present invention, since the mounting posture of the housing in the interior of an automobile is adjusted by operating the manual operating unit and push-button switches provided in the housing itself, it is not necessary to use any special device for controlling the posture of the housing and therefore the whole of the input device can be constructed compactly.

Further, in the vehicular input device according to the present invention, since the position sensor and push-button switches provided in the input device are electrically connected to the display through a computer both provided in an automobile and the mounting posture of the housing, which is adjusted by operating the manual operating unit and the push-button switches both provided on the housing, as well as the operation of the manual operating unit, are displayed on the display, an operator can adjust the mounting posture of the housing while checking the displayed contents on the display and thus it is possible to control the posture of the housing quickly and positively.

What is claimed is:

1. A vehicular input device comprising:

a housing;

a mounting mechanism for changing a mounting posture of the housing in respect to the interior of an automobile;

a manual operating unit mounted on an upper surface of the housing;

a position sensor which outputs a position signal corresponding to the direction and amount in which the manual operating unit is operated; and wherein the mounting posture of the housing in the interior of an automobile is changed by the mounting mechanism in response to the position signal from the position sensor which is outputted by operating the manual operating unit.

2. A vehicular input device according to claim 1, wherein the mounting posture of the housing in the interior of the automobile is changed in a forward or rearward direction and a slant direction in the interior of the automobile by operating the manual operating unit provided on the housing in response to the position signal outputted by the position sensor.

3. A vehicular input device according to claim 1, further comprising a display and computer in the automobile wherein the position sensor is electrically connected to the display through the computer to display an image of the housing and indicators of how its posture can be changed by operating the manual operating unit provided on the housing, as well as indicators showing the direction that the manual operating unit must be moved to acquire the desired movement of the housing.

4. A vehicular input device according to claim 1, wherein:

a mounting mechanism for mounting the housing in the interior of an automobile comprises:

a base;

a ball screw rotatably supported at the base through bearings;

a nut engaged with the ball screw;

a transfer plate fixed to the nut;

a first motor connected to the ball screw for rotating the ball screw to cause the housing to be moved in a forward or rearward direction;

a rotary shaft attached to the housing via bearings by a mounting plate and rotatably supported by the bearings; and a second motor engaged with the rotary shaft for rotating the rotary shaft to cause the housing to be moved in a slant direction.

5. A vehicular input device according to claim 1, wherein:

a motor for applying a resistive feeling is fixed to the manual operating unit, and the resistive feeling in compliance with a movable range of the housing is applied to the manual operating unit.

* * * * *